(12) United States Patent
Ayers

(10) Patent No.: US 10,162,804 B2
(45) Date of Patent: Dec. 25, 2018

(54) OBJECT RESIZING WITH CONTENT REFLOW

(71) Applicant: Adobe Systems Incorporated, San Jose, CA (US)

(72) Inventor: Robert M. Ayers, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 259 days.

(21) Appl. No.: 15/161,090

(22) Filed: May 20, 2016

(65) Prior Publication Data

US 2016/0267059 A1 Sep. 15, 2016

Related U.S. Application Data

(63) Continuation of application No. 11/130,578, filed on May 16, 2005, now Pat. No. 9,384,171.

(51) Int. Cl.
*G06F 17/21* (2006.01)
*G06F 3/0484* (2013.01)
*G06F 3/0482* (2013.01)
*G06F 3/0485* (2013.01)

(52) U.S. Cl.
CPC .......... *G06F 17/212* (2013.01); *G06F 3/0482* (2013.01); *G06F 3/04842* (2013.01); *G06F 3/04855* (2013.01); *G06F 17/211* (2013.01); *G06F 2203/04806* (2013.01)

(58) Field of Classification Search
CPC ............................ G06F 17/211; G06F 3/04842
See application file for complete search history.

(56) References Cited

U.S. PATENT DOCUMENTS

| 5,623,681 | A | 4/1997 | Rivette et al. |
| 5,819,301 | A | 10/1998 | Rowe et al. |
| 6,005,560 | A | 12/1999 | Gill et al. |
| 6,101,283 | A | 8/2000 | Knox |
| 7,082,567 | B1 | 7/2006 | Young et al. |
| 7,231,381 | B2 * | 6/2007 | Li ................... G06F 17/30017 707/766 |
| 7,533,338 | B2 * | 5/2009 | Duncan ............... G06F 17/211 707/999.104 |
| 7,769,794 | B2 * | 8/2010 | Moore .............. G06F 17/30126 707/822 |

OTHER PUBLICATIONS

Bootie Cosgrove-Mather, "Microsoft Revamps Office Software," Oct. 22, 2003, The Associated Press.
Camarda, Bill, "Special Edition Using Microsoft Office Word 2003," Dec. 22, 2003, Que Publishing, ISBN-10:078972958X, ISBN-13:978-0789729583, p. 577.
Microsoft Corporation, Microsoft Office Word, 2003, Microsoft Corporation, version 11.8313.8172 with service pack 3.
Microsoft, Microsoft Word 2003 Screenshots from Microsoft Office Word 2003 (11.5604.5606), Copyright 2003.

* cited by examiner

*Primary Examiner* — Alvin H Tan
(74) *Attorney, Agent, or Firm* — Kilpatrick Townsend & Stockton LLP

(57) ABSTRACT

Briefly, in accordance with one or more embodiments, content of a file such as text content may be reflowed in response to a resizing of an object also included in the file.

18 Claims, 5 Drawing Sheets

OBJECT RESIZING WITH CONTENT REFLOW

CROSS-REFERENCE TO RELATED APPLICATIONS

This application claims priority to U.S. patent application Ser. No. 11/130,578, filed May 16, 2005, entitled "Object Resizing With Content Reflow," the contents of which is incorporated herein by reference in its entirety.

BACKGROUND

Electronic documents for display on an electronic display of a computing platform or similar device typically may contain both text and/or other objects such as images combined into a single layout. The images may correspond to context elements contained within the text, for example where the text describes a corresponding image located adjacent to that passage of text. Usually, the image is placed at a location with reference to the context elements in a prearranged format so that when a reader reads the text, the image appears in a location in the document so that the image and the text may be referred to together. Images in such documents may be smaller sized to accommodate a convenient layout of the text and the images in the document. However, since the images are represented electronically, it is possible for the user to resize the image within the document, at least temporarily, for further examination and enhancement of the details and/or contents of the image. Typically, when a user magnifies an image in such a mixed content document, the larger sized image will be displayed in a new window different from the window in which the original document is displayed, and the user may lose the context of the image with respect to the corresponding text in the original document. In other instances, the larger sized image may cover the adjacent text rendering the adjacent text unreadable when the image is enlarged.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
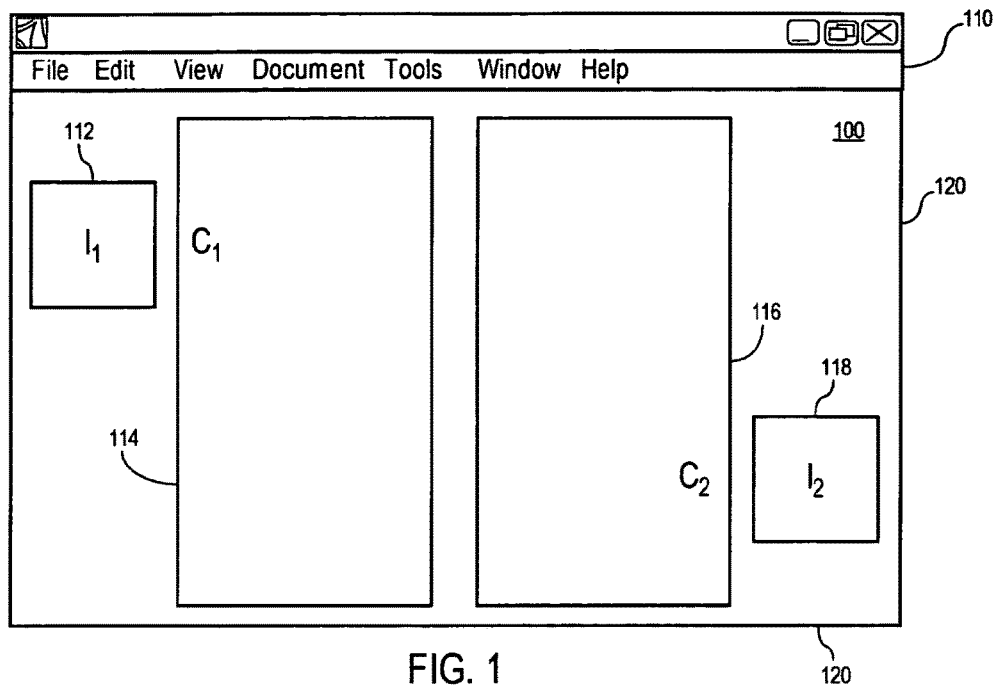
FIG. 1 is a diagram of a file including one or more objects and associated text content in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of processes, programs and/or symbolic representations of operations on data bits and/or binary digital signals within a computer memory, for example. These algorithmic descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example shapes, pictures, images, text, and/or text boxes that may appear on a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like. In one or more embodiments, a format may refer to a predefined organizational structure for data, code, instructions, and/or other information that may be readable, accessible, and/or able to be acted on by a computing platform and/or the like. In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. In one embodiment, content reflow may refer to where the contents of a document may be rearranged to alter the layout, order, and/or readability of the content of the document. In one or more embodiment, transient may refer to being in a state for a brief and/or temporary period of time, and/or passing with time and/or a temporary state of being. However, these are merely example definitions of terms relating to graphical user interfaces and/or computing platforms and/or the like, and the scope of claimed subject matter is not limited in this respect.

Referring now to FIG. 1, a diagram of a file including one or more objects and associated text content in accordance with one or more embodiments will be discussed. As shown in FIG. 1, file 100 may comprise a document displayed in and/or controlled by program 110. In one embodiment, program 110 may comprise an Adobe® Acrobat® type program available from Adobe Systems Incorporated of San Jose, Calif., USA, and file 100 may comprise an Adobe® Portable Document Format (PDF) type file, although the scope of claimed subject matter is not limited in these respects. In one embodiment, document 100 may be authored and/or created in a page description language (PDL), which refers to a language for describing a layout and/or contents of a page to be displayed and/or printed. Such a page description language, may comprise, for example, Adobe® PostScript® available from Adobe Systems Incorporated. PostScript®, for example, describes a page in terms of page objects including textual objects and/or graphical objects such as lines, arcs, and/or circles. PostScript® may be used, for example, to create Portable Document Format type files, although the scope of claimed subject matter is not limited in this respect. In another embodiment, program 110 may be a word processor and/or a text processor, for example Microsoft® Word available from Microsoft Corporation of Redmond, Wash., USA, and file 100 may be a Microsoft® Word type file, although the scope of claimed subject matter is not limited in this respect. In yet another embodiment, program 110 may comprise a web browser to open and/or display web pages, and file 100 may comprise a Hyper Text Markup Language (HTML) type file. In such an embodiment, program 110 may comprise, for example, a Microsoft® Internet Explorer web browser available from Microsoft Corporation, or alternatively may be, for example, a Firefox web browser available from the Mozilla Foundation of Mountain View, Calif., USA, although the scope of claimed subject matter is not limited in this respect.

In one embodiment, file 100 may include, for example, text displayed in a column format, for example text may be displayed in first column 114, and/or in second column 116. Program 110 may include a boundary 120 in which some content may be viewable within boundary 120, while some content may extend beyond boundary 120 but may not be immediately viewable with program 110 unless and/or until a user controls program 110 to display such content of file 100, for example using a scroll bar. In one or more embodiments, first column 114 and/or second column 116 may comprise objects such as text and/or text boxes that contain text, although the scope of claimed subject matter is not limited in this respect. A first object, such as first image ($I_1$) 112, may be displayed adjacent to first column 114, and/or a second object, such as second image ($I_2$) 118, may be displayed adjacent to second column 116. In one embodiment, first image 112 may be displayed adjacent to a first context element (C1) of the text in first column 114, and/or second image 118 may be displayed adjacent to a second context element (C2) of the text in second column 116. For example, the first context element may comprise a word that is the name of a first insect, and first image 112 may comprise an image of the first insect, and/or the second context element may be a word that is the name of a second insect, and second image 118 may comprise an image of the second insect. In such an example, the text in first column 114 and/or in column 116 may comprise a passage regarding entomology that discusses insects such as the first insect and the second insect, although the scope of claimed subject matter is not limited in this respect. When a user reads the text of document 100, the user may refer to first image 112 with respect to the first context element, and/or may refer to second image 118 with respect to the second context element, although the scope of claimed subject matter is not limited in this respect. In one or more embodiments, a context and/or a context relationship may refer to where an author of file 100 may intend two or more objects to be viewed simultaneously, nearly simultaneously, concurrently, and/or in succession, and/or otherwise may be related, for example where a text passage in a first object refers to the content of a related image. In one or more embodiments, where a first object is in a context relationship with another object, the first object generally may be disposed adjacent to and/or proximate to, and/or intended by an author to be disposed adjacent to and/or proximate to, the other object in a given layout of a file and/or document, although the scope of claimed subject matter is not limited in this respect.

Figure 2:
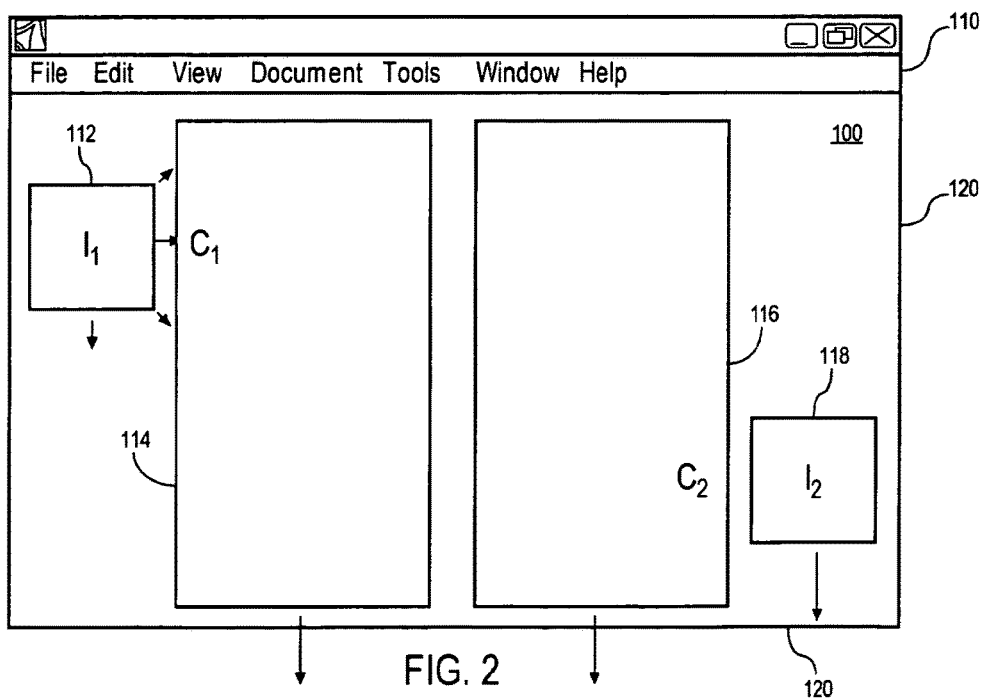
FIG. 2 is a diagram of a file illustrating content reflow in the event an object is resized in accordance with one or more embodiments.

Referring now to FIG. 2, a diagram of a file illustrating content reflow in the event an object is resized in accordance with one or more embodiments will be discussed. In one embodiment, when a user is referring to first image 112 with respect to the first context element, the user may desire to resize first image 112, for example to better view details of first image 112. In such an embodiment, the user may specify the size of first image 112 to be changed from its originally presented size, for example the user may specify an increase in the size of first image 112 to magnify its contents. A user may alter the size of first image 112, for example, by selecting first image with a mouse and/or other cursor control device and/or pointing device, and then may open a menu of actions that may be taken with respect to selected first image 112 where the menu may include a command to increase the size of first image 112, decrease the size of first image 112, and/or select a zoom amount in terms of percentage of the originally presented size of the image. In one embodiment, a user may select first image 112 and then pull down a menu for example using a "View" command as shown in program 110. In yet an alternative embodiment, a user may magnify and/or demagnify first image 112 by using a zoom tool where the amount of magnification and/or demagnification may be controlled using a mouse or a similar cursor control device and/or pointing device, although the scope of claimed subject matter is not limited in this respect. In one particular embodiment, a user may toggle first image 112 between its originally presented size and a larger size, for example via mouse clicks or the like input. In such an embodiment, a user my click on first image 112 to increase its size from its originally presented size to a larger size via a first mouse click and/or a double click. The user may then return first image 112 from the larger size to its originally presented size, for example with a subsequent mouse click and/or a double click, although the scope of claimed subject matter is not limited in this respect. In one or more embodiments, resize may refer to altering the displayed size of an object, for example where the object may be increased and/or decreased in size relative to an originally displayed size of the object, for example where program 110 may render the object to have a displayed size that is different from an originally displayed size in file 100, although the scope of claimed subject matter is not limited in this respect.

In one or more embodiments, as shown in FIG. 2, image size may increase from a first, originally presented size to a larger size. As the image size of first image 112 is increased, for example as shown by the arrows, first image 112 may encroach the boundary of first column 114 in which text is contained. In one or more embodiments, encroach may mean where one object breaches, overlaps and/or extends into another object at least in part, and/or where one object breaches, overlaps, and/or extends into a boundary of another object at least in part, and/or where a boundary of a first object breaches, overlaps, and/or extends into a boundary of another object at least in part, and/or where a penumbral region of a first object overlaps, breaches, and/or extends into a penumbral region of another object at least in part, although the scope of claimed subject matter is not limited in this respect. In order to view a larger sized first image 112 and the corresponding text in first column 114, text in first column 114 may be reflowed to accommodate the larger area occupied by first image 112 when viewed as a larger size. For example, text corresponding to the first context element may be moved down first column as first image 112 encroaches into the area occupied by first column 114. As text is reflowed to accommodate a larger size of first image 112, column 114 may be extended to be longer in length to make up for area lost due to the encroachment of first image 112 into first column 112 and the reflow of text in first column 112 in response to such encroachment. In one or more embodiments, reflow may refer to the rearranging of the contents of an object to be rendered in a new arrangement and/or layout as displayed on a display, optionally retaining at least a portion of the logical order, sequence, arrangement, and/or pattern of the contents of the object, for example so that a viewer may recognize the content reflowed object as resembling at least in part the content of the object in an unflowed form, although the scope of claimed subject matter is not limited in this respect. In one ore more embodiments, accommodate may refer to where an object is reflowed in response to a resizing of another object, and the reflowed object is rearranged and/or reshaped wherein the contents of the reflowed object are not obscured by the resized other object, although the scope of claimed subject matter is not limited in this respect. In one embodiment, text at the bottom of first column 114 may be reflowed to wrap around into the top of second column 116, and the text in second column 116 may likewise reflow to accommodate the incoming reflow of text into second column 116 from first column 114. In one embodiment, such reflow may include moving the second context element down further down second column 116 to accommodate the text reflow. In one particular embodiment, such movement of the second context element may be accompanied by a movement of second image 118 with respect to the movement of the second context element, as shown by the arrow, for example so that second image 118 may remain disposed adjacent to the second context element, and the overall context of document 100 may be retained after the reflow of text responsive to the enlargement of first image 112, although the scope of claimed subject matter is not limited in this respect.

In another embodiment, one or more of column 114 and/or column 116 may be extended beyond boundary 120, as shown by the arrow, wherein a portion of column 114 and/or column 116 may not be immediately viewable by the user after the reflow of the text. In one embodiment, the size of the immediate page of document 100 that contains column 114 and/or 116 may be enlarged to accommodate the increased length of column 114 and/or column 116. In another embodiment, in the event the length of column 114 and/or column 116 extends beyond a predetermined page length, for example beyond the page size of file 100, optionally accounting for page margins, text in column 114 and/or column 116 may continue onto a second page as a result of the text reflow, wherein a portion of the text may flow over into the second page, optionally in additional columns, although the scope of claimed subject matter is not limited in this respect. In an alternative embodiment, the columnar format may be adjusted to accommodate the larger size of first image 112, for example file 100 may switch from a two column layout to a single column layout, and first column 114 may be widened and/or lengthened to fill a single column in file 100, and second column 116 may be likewise widened to fill a single column in file 100 following first column 114, although the scope of claimed subject matter is not limited in this respect.

Figure 3:
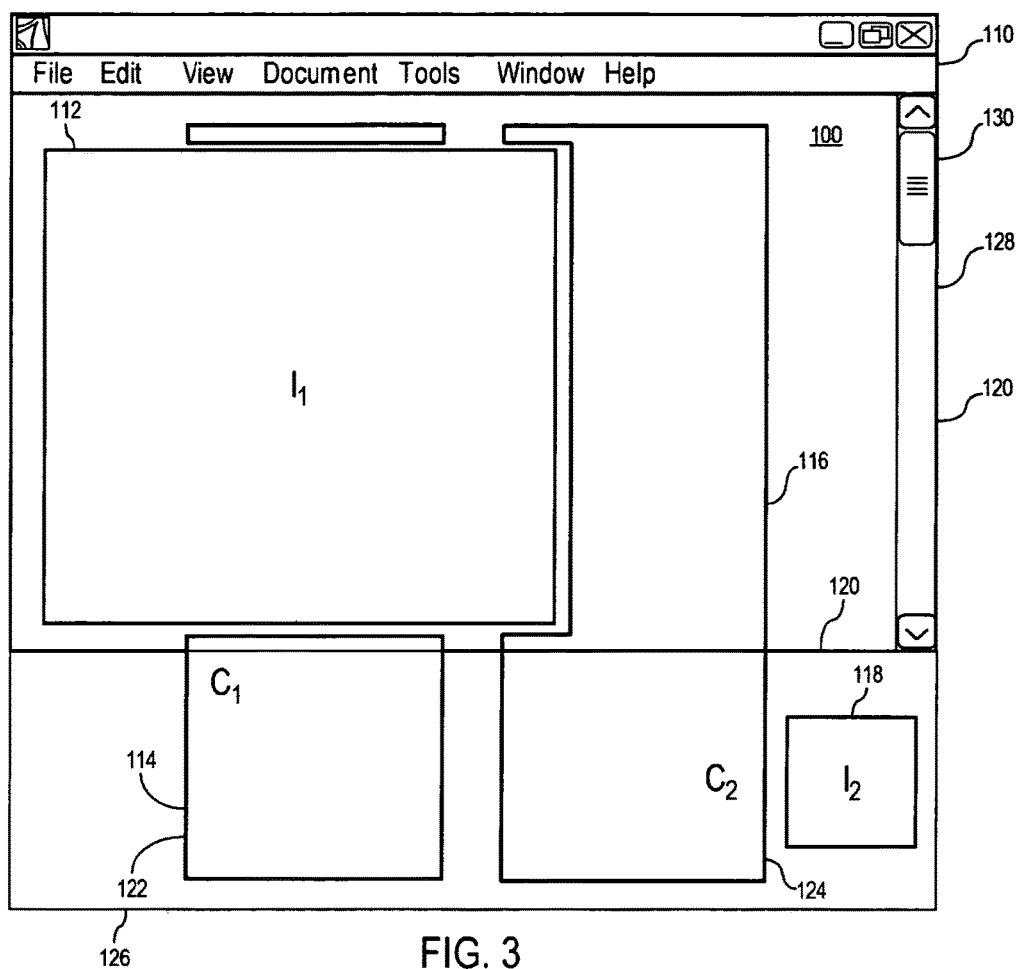
FIG. 3 is a diagram of a file illustrating reflowed content in response to an object resize event in accordance with one or more embodiments.

Referring now to FIG. 3, a diagram of a file illustrating reflowed content in response to an object resize event in accordance with one or more embodiments will be discussed. In one embodiment, when first image 112 is enlarged from an originally presented size such as shown in FIG. 1 and/or in FIG. 2, to a larger size such as shown in FIG. 3, content adjacent to first image 112 may be reflowed to accommodate the larger area of first image 112. For example, as shown in FIG. 3, first image 112, when enlarged, may encroach the area of first column 114 and/or the area of second column 116. Content of first column 114 and/or second column 116 that would otherwise be obscured by first image 112 when enlarged may be reflowed around and/or external to the area of first image 112 so that the content of first column 114 and/or second column may not be obscured by first image 112. In one embodiment, content, such as text, of first column may be reflowed, and the size of column 114 and/or column 116 may be resized to accommodate the reduced area of column 114 and/or column 116 encroached by first image 112. In such an embodiment, at least a portion 122 of column 114 and/or at least a portion 124 of column 116 may extend beyond boundary 120 into a hidden portion 126 of file 100 that may not be immediately viewable in program 110. In one embodiment, the first context element and/or the second context element may be reflowed so to be located in portion 122 of first column 114 and/or portion 124 of second column 116 located in hidden portion 126 of file 126. Likewise, second image 118 may be moved as a result of the reflow to be located in hidden portion 126 of file 126, at least in part or in its entirety, although the scope of claimed subject matter is not limited in this respect. In one embodiment, where the reflow causes portion 122 of first column 122, portion 124 of second column, and/or at least a part of image 118 to be located in hidden portion 126, program 110 optionally may display a scroll bar 128 to allow a user to scroll down to hidden portion 126 wherein hidden content may be moved within boundary 120 and become no longer hidden but viewable to the user, which may be controlled by the user, for example, via scroll button 130, although the scope of claimed subject matter is not limited in this respect.

Figure 4:
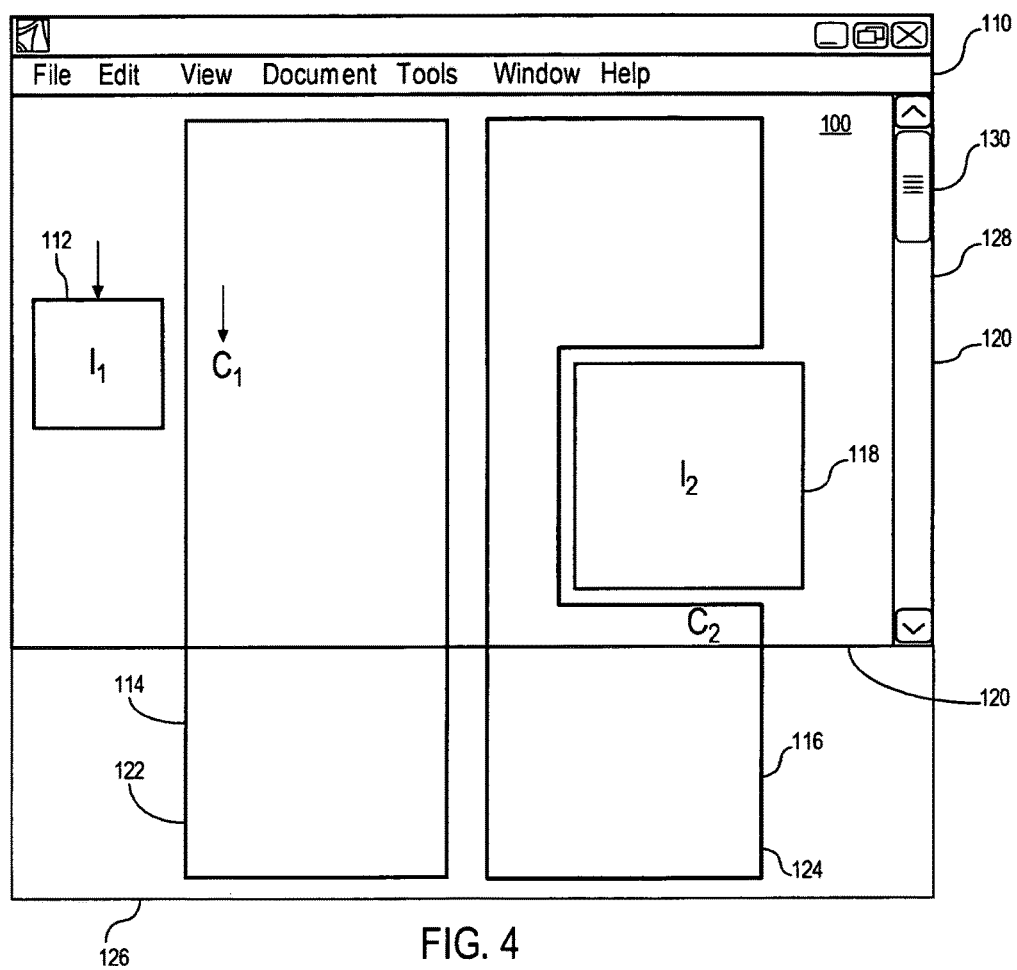
FIG. 4 is a diagram of a file illustrating reflowed content in response to an alternate object resize event in accordance with one or more embodiments.

Referring now to FIG. 4, a block diagram of a file illustrating reflowed content in response to an alternate object resize event in accordance with one or more embodiments will be discussed. As shown in FIG. 4, first image 112 may be displayed in its originally presented size, and second image 118 may be displayed in an enlarged size. In one embodiment, such an arrangement may occur when, for example, after enlargement of first image 112 as shown in FIG. 3, a user reduces the size of first image 112 from a larger size to a smaller size, for example in a manner as described with respect to FIG. 2 and/or FIG. 3. A user may enlarge the size of second image 118 in a manner such as described in FIG. 2 and/or FIG. 3 with respect the changing of size of first image 112. In alternative embodiment, when first image 112 is displayed in a larger size and second image 118 is displayed as a smaller size, for example as shown in FIG. 3, a user may select to increase the size of second image 118, for example as described with respect to the resizing of first image as discussed with respect to FIG. 2 and/or FIG. 3. In such an embodiment, second image 118 may be enlarged and/or first image 112 may be reduced in size simultaneously, concurrently, and/or sequentially, responsive to a single input event initiated by the user. For example, by clicking on second image 118, the user may cause the enlargement of second image 118 and/or the reduction in size of first image 112, for example to its originally presented size, in response to the clicking event, although the scope of claimed subject matter is not limited in this respect. When a user subsequently clicks second image 118 in a larger state, the size of second image 118 may be reduced to its originally presented size, and text may be reflowed to accommodate the smaller size of image 112 and/or image 114, which may be represented, for example, by the original presentation of the content of file 100 as shown in FIG. 1, although the scope of claimed subject matter is not limited in this respect.

As shown in FIG. 4, when second image 118 is enlarged, it may encroach upon second column 116. To preserve the context relationship of the content of second column 116 with respect to second image 118, text in second column 116 may be reflowed to accommodate the larger size of second image 118. Such a reflow may cause text in second column 116 to be displaced up and/or down column 116 so that text in column 116 will not be obscured by second image 118. For example, the second context element may be moved down second column 116 as part of the text reflow. The second context element may still remain adjacent to second image 118, for example so that a user may read the text corresponding to the second context element while viewing second image 118. If the second context element has been reflowed into hidden area 126, a user may navigate down file 100 using scroll button 130 of scroll bar 128. In one embodiment, second image 118 may be enlarged to encroach beyond second column 116 onto first column 114, for example as shown in FIG. 4. In such an embodiment, text in first column 114 may be reflowed to accommodate such encroachment of second image 118 into first column 114. As a result of such reflow, the first context element may be displaced up and/or down first column 114, as shown by the arrow, to accommodate the reduced area in first column 114, that is now occupied by second image 118. In one embodiment, first image 112 may be displaced down along first column 114; as shown by the arrow, with respect to the first context element wherein first image 112 may remain displayed adjacent to the first context element after the reflow, although the scope of claimed subject matter is not limited in this respect.

Figure 5:
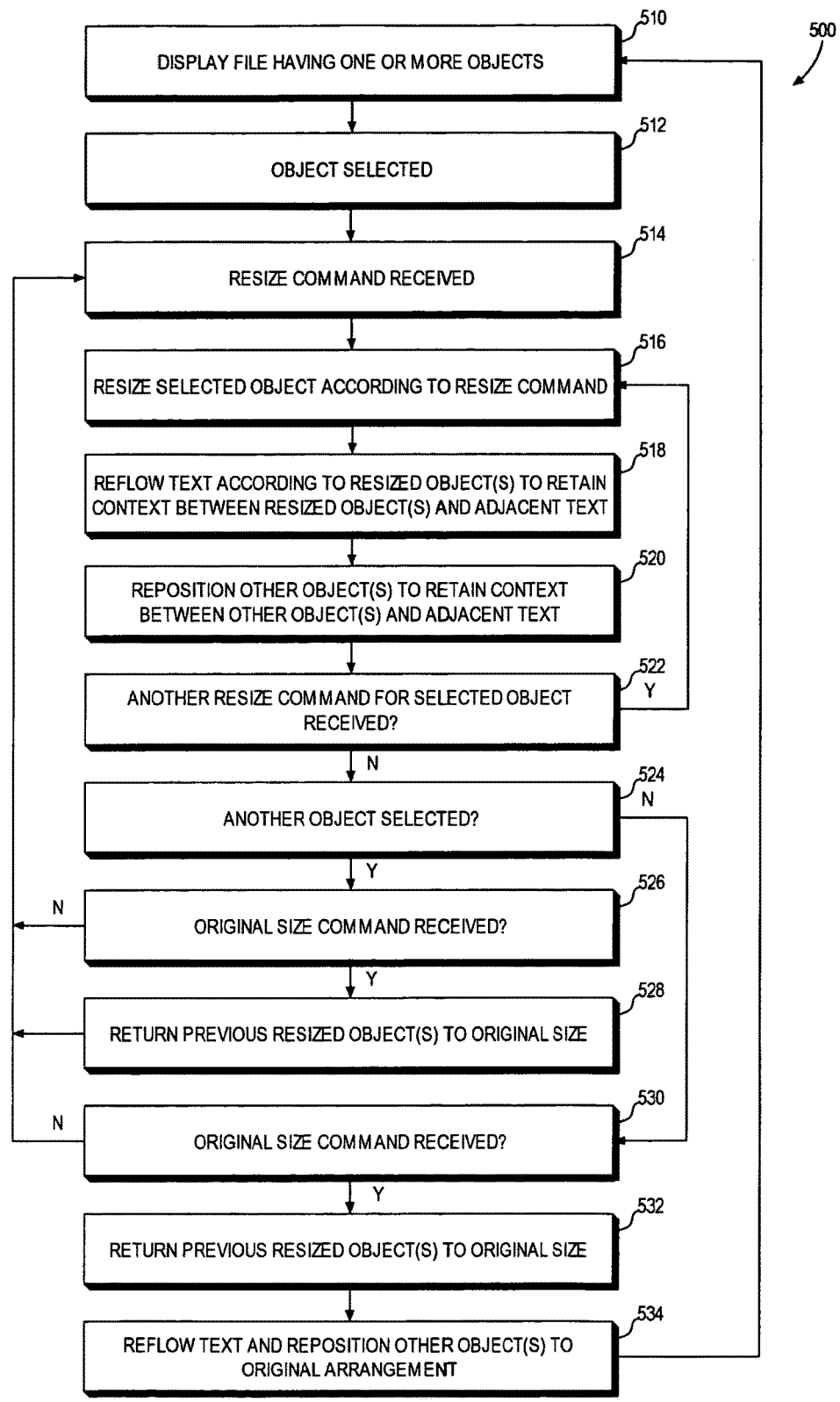
FIG. 5 is a flow diagram of a process for content reflow in response to an object resize event in accordance with one or more embodiments.

Referring now to FIG. 5, a flow diagram of a process for content reflow in response to an object resize event in accordance with one or more embodiments will be discussed. In one or more embodiments, process 500 may include blocks 510 through 534, more blocks and/or fewer blocks than shown in FIG. 5. Furthermore, the order of blocks 510 through 534 is merely one order of blocks, wherein process 500 may include one or more alternative orders of blocks 510 through 534, and the scope of claimed subject matter is not limited in this respect. A file 100 having one or more objects may be displayed at block 510. An object, such as first image 112 and/or second image 118, may be selected at block 512. A resize command may be received at block 514 to resize the selected object. In one embodiment, the resize command may include a command to magnify the selected object to a larger size, for example to a preselected magnification size and/or ratio between the original size of the object and the larger size of the object, for example a 2× magnification ratio. In another embodiment, a user may select an amount of magnification and/or zoom to which the object may be enlarged, which may be a continuous and/or a nearly continuous magnification and/or zoom ratio and/or amount. However, these are merely examples of a resize command and/or routine, and the scope of claimed subject matter is not limited in this respect. Program 110 may resize the selected object at block 516 according to the resize command received at block 514. Program 110 may reflow text in file 100 according to the resized object, and/or objects in the event multiple objects are concurrently resized, to retain the context between and/or among the resized object and/or objects and the text adjacent to the resized object and/or objects. In the event text adjacent to another object and/or objects is displaced as a result of the reflow at block 518, the other object and/or objects may be repositioned at block 520 adjacent to the new positions of corresponding text to which the object and/or objects was originally adjacent prior to the reflow to likewise retain the context between the other object and/or objects. A determination may be made at block 522 whether another resize command is received for the selected object, and if so, process 500 may continue by continuing execution at block 516. If not, a determination may be made at block 524 whether another object is selected, and if so, a determination may be made at block 526 whether an original size command is received at block 526 to return the previous selected object to its original size. In one embodiment, a user may optionally provide the original size command, and in an alternative embodiment, the original size command may be automatically received and/or executed and/or may be inherently executed when a resize command is received to resize the other selected object as may occur when method branches to block 514. Such branching to block 514 from block 526 in the event an original size command is not received at block 526, or alternatively when a user optionally selects to resize two or more objects at the same time and/or sequentially to be enlarged at the same time. Such branching to block 514 from block 526 may also occur in the event an original size command is received at block 526, and the previous selected object and/or objects may resized to its original size at block 528.

In one embodiment, if another object is not selected at block 524, a determination may be made at block 530 whether an original size command is received, for example in a manner as described with respect to block 526. If an original size command is not received at block 530, process 500 may branch to block 514, and process 500 may continue when a resize command is received at block 514 to resize the other object selected at block 524. In the event an original size command is received at block 530, the previous resized object and/or objects may be returned to the original size of the object and/or objects at block 532, and text may be reflowed to an original arrangement, and/or the other object and/or objects may be returned to an original arrangement at block 534. Process 500 may optionally continue execution when an object is selected at block 512. The resizing of objects, the reflow of text, and/or the repositioning of other objects as described with respect to FIG. 500 is merely an example of a method for object resizing with content reflow, and other alternative embodiments and/or implementations may be made. For example, first object 112, second object 118, first column 114, and/or second column 116, may include any type of object, including but not limited to images, movies, media, text, text boxes, graphs, patterns, charts, windows, fonts, letters, characters, symbols, links, dynamic content, buttons, menus, tools, toolbars, dialogue boxes, radio buttons, scroll bars, scroll buttons, cursors, and/or the like, and furthermore may be presented in file 100 in any combination thereof, and the scope of claimed subject matter is not limited in this respect.

Figure 6:
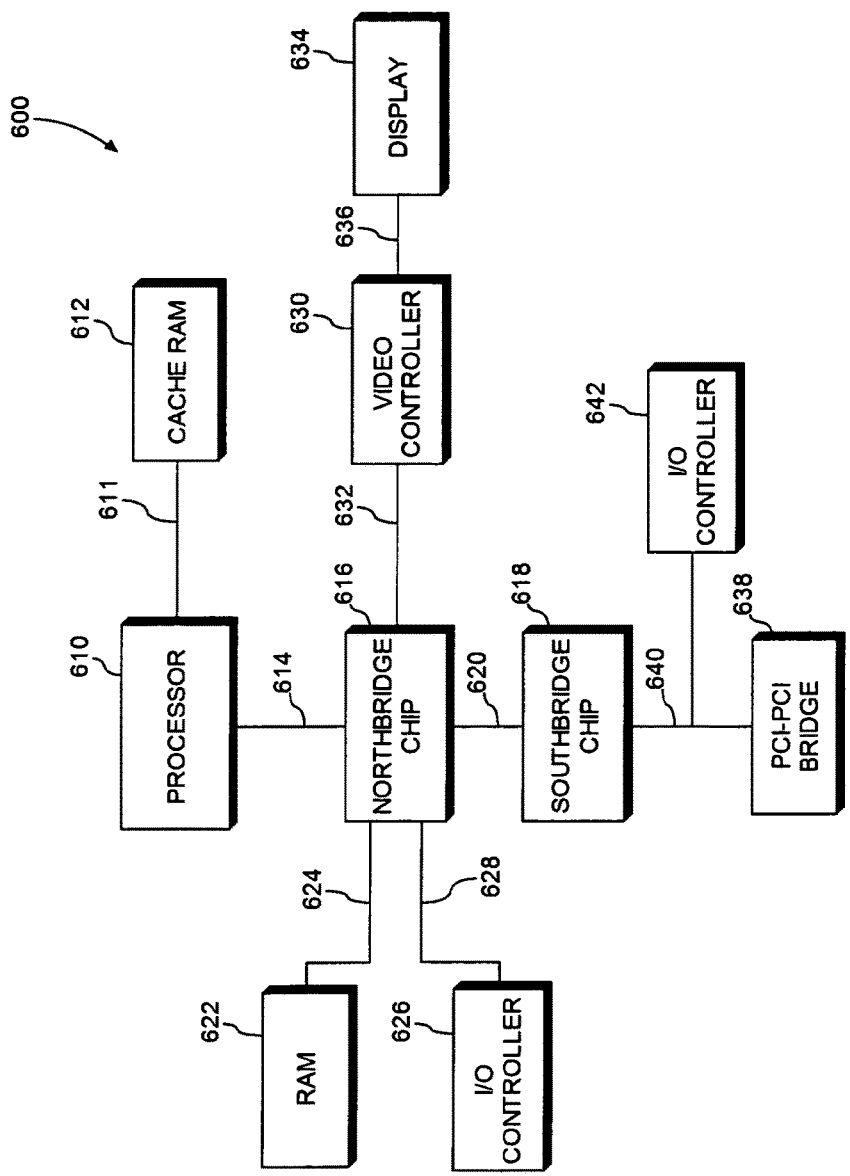
FIG. 6 is a block diagram of a computing platform capable of executing content reflow in response to an object resize event in accordance with one or more embodiments.

Referring now to FIG. 6, a block diagram of a computing platform capable of executing content reflow in response to an object resize event in accordance with one or more embodiments will be discussed. It should be noted that computing platform 600 of FIG. 6 is merely one type of computing platform, and other computing platforms having more and/or fewer components than shown in FIG. 6 may be implemented, and the scope of claimed subject matter is not limited in this respect. In one or more embodiments, computing platform 600 may be utilized to implement process 600 in whole and/or using more and/or fewer blocks than shown in FIG. 5, and the scope of claimed subject matter is not limited in this respect. Computing platform 600 may include processor 610 coupled to cache random access memory (RAM) 612 via back side bus 611. Processor 610 may also couple to a chipset that includes Northbridge chip 616 via front side bus 614, and also to Southbridge chip 618 via bus 620. In one embodiment, Northbridge chip 616 in general may be utilized to connect a processor to memory, to an input/output bus, to a video bus, and to Level 2 cache, although the scope of claimed subject matter is not limited in this respect. In one embodiment, Southbridge chip 618 may be utilized to control input/output functions, the basic input/out system (BIOS), an interrupt control functions of Integrated Drive Electronics (IDE) devices such as hard disks or compact disk-read only memory (CD-ROM) devices or the like, although the scope of claimed subject matter is not limited in this respect. Random access memory (RAM) 622 may couple to Northbridge chip 616 via main memory bus 624, and input/output (I/O) controller 626 may also couple to Northbridge chip 616 via I/O bus 628. In one embodiment, I/O controller 626 and I/O bus 628 may be in compliance with a Small Computer Systems Interface (SCSI) specification such as the American National Standards Institute (ANSI) X3.131-1994 SCSI-2 specification, although the scope of claimed subject matter is not limited in this respect. In an alternative embodiment, I/O controller 626 and I/O bus 628 may be in compliance with a Peripheral Component Interconnect (PCI) bus, although the scope of claimed subject matter is not limited in this respect.

Video controller 630 may couple to Northbridge chip 616 via video bus 632 which in one embodiment may comprise an Accelerated Graphics Port (AGP) bus, although the scope of claimed subject matter is not limited in this respect. Video controller 630 may provide video signals to an optionally coupled display 634 via display interface 636 which in one embodiment may comprise a Digital Visual Interface (DVI) in compliance with a standard promulgated by the Digital Display Working Group, although the scope of claimed subject matter is not limited in this respect. Southbridge chip 618 may couple to a peripheral component interconnect to peripheral component interconnect (PCI-PCI) bridge 638 via input/output bus 640, which may in turn couple to I/O controller 642 to control various peripheral devices such as Universal Serial Bus (USB) devices, or devices compatible with an Institute of Electrical and Electronics Engineers (IEEE) 1394 specification, although the scope of claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to object resizing with content reflow and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method comprising:
   executing instructions, by a processor, to direct the processor to:
      display content within a display area in a columnar format, wherein the content comprises a context element and text displayed in a column,
      display an object within a display area and outside of the column, wherein the context element and the object are associated with each other based on a relationship, and wherein the context element and the object are displayed adjacent to each other within the display area based on the relationship;
      receive input indicating a request to automatically adjust the display of the object by an amount, wherein the input indicates a resizing of the object such that the object encroaches into the column; and
      in response to the input:
         automatically adjust the display of the object by the amount, wherein automatically adjusting the display of the object comprises resizing the object based on the amount such that the resized object encroaches into the column, wherein the context element is adjacent to a boundary of the object prior to the resizing of the object, and
         automatically reflow the content within the display area such that the context element and the object remain adjacent to each other within the display area based on the relationship and such that at least a portion of the text is moved within the display area based on the context element and the object remaining adjacent to each other, wherein automatically reflowing the content comprises moving the context element within the column such that the context element becomes adjacent to another boundary of the object based on the amount of the resizing of the object.

2. The method of claim 1, wherein the input indicates a direction and the amount for a movement of the object, wherein the movement is parallel to the column and does not encroach into the column, and wherein automatically adjusting the display of the object comprises moving the object parallel to the column and without encroaching into the column according to the direction and the amount.

3. The method of claim 2, wherein automatically reflowing the content comprises moving the context element within the column according to the direction and the amount for the movement of the object.

4. The method of claim 3, wherein the moving of the context element is parallel to the moving of the object.

5. The method of claim 2, wherein automatically reflowing the content comprises moving the portion of the text within the column based on the moving of the context element being parallel to the moving of the object.

6. The method of claim 2, wherein automatically reflowing the content comprises moving the portion of the text to another column that is displayed within the display area and that is adjacent to the column.

7. The method of claim 1, wherein automatically reflowing the content comprises moving the context element within the column such that the context element remains adjacent to a boundary of the object.

8. The method of claim 7, wherein automatically reflowing the content comprises moving the portion of the text within the column based on the moving of the context element within the column.

9. The method of claim 7, wherein automatically reflowing the content comprises moving the portion of the text to another column that is displayed within the display area and that is adjacent to the column.

10. The method of claim 1, wherein the context element is adjacent to a boundary of the object prior to the resizing of the object, and wherein automatically reflowing the content comprises moving the context element within the column such that the context element remains adjacent to the boundary of the object based on the amount of the resizing of the object.

11. A system comprising:
    a processor; and
    a memory storing computer-readable instructions that, upon execution by the processor, cause the system to:
       display content within a display area in a columnar format, wherein the content comprises a context element and text displayed in a column,
       display an object within a display area and outside of the column, wherein the context element and the object are associated with each other based on a relationship, and wherein the context element and the object are displayed adjacent to each other within the display area based on the relationship;
       receive input indicating a request to automatically adjust the display of the object by an amount, wherein the input indicates a resizing of the object such that the object encroaches into the column; and
       in response to the input:
          automatically adjust the display of the object by the amount, wherein automatically adjusting the display of the object comprises resizing the object based on the amount such that the resized object encroaches into the column, wherein the context element is adjacent to a boundary of the object prior to the resizing of the object, and automatically reflow the content within the display area such that the context element and the object remain adjacent to each other within the display area based on the relationship and such that at least a portion of the text is moved within the display area based on the context element and the object remaining adjacent to each other, wherein automatically reflowing the content comprises moving the context element within the column such that the context element becomes adjacent to another boundary of the object based on the amount of the resizing of the object.

12. The system of claim 11, wherein the object comprises an image, and wherein the context element comprises a set of words that describes a set of elements captured in the image.

13. The system of claim 11, wherein the context element is adjacent to a boundary of the object, wherein the input indicates a movement of the object, wherein the movement does not encroach into the column, wherein automatically adjusting the display of the object comprises moving the object according to the movement and without encroaching into the column, and wherein automatically reflowing the content comprises:

moving the context element within the column based on the movement of the object such that the context element remains adjacent to the boundary of the object, and moving the portion of the text within the column based on the moving of the context element.

14. The system of claim 11, wherein the context element is adjacent to a boundary of the object, wherein the input indicates increasing a size of the object by the amount such that the boundary of the object encroaches into the column, wherein automatically adjusting the display of the object comprises increasing the size of the object according to the amount, and wherein automatically reflowing the content comprises:

moving the context element within the column such that the context element remains adjacent to the boundary or to another boundary of the object, and moving the portion of the text within the column based on the moving of the context element.

15. A non-transitory computer-readable storage medium storing instructions that, upon execution by a processor of a system, cause the system to:

display content within a display area in a columnar format, wherein the content comprises a context element and text displayed in a column, display an object within a display area and outside of the column, wherein the context element and the object are associated with each other based on a relationship, and wherein the context element and the object are displayed adjacent to each other within the display area based on the relationship;

receive input indicating a request to automatically adjust the display of the object by an amount, wherein the input indicates a resizing of the object such that the object encroaches into the column; and in response to the input:

automatically adjust the display of the object by the amount, wherein automatically adjusting the display of the object comprises resizing the object based on the amount such that the resized object encroaches into the column, wherein the context element is adjacent to a boundary of the object prior to the resizing of the object, and automatically reflow the content within the display area such that the context element and the object remain adjacent to each other within the display area based on the relationship and such that at least a portion of the text is moved within the display area based on the context element and the object remaining adjacent to each other, wherein automatically reflowing the content comprises moving the context element within the column such that the context element becomes adjacent to another boundary of the object based on the amount of the resizing of the object.

16. The non-transitory computer-readable storage medium of claim 15, wherein the instructions, upon execution by the processor, further cause the system to:

automatically reflow second content in a second column based on the automatically reflowing of the content, wherein the second column is displayed within the display are and is adjacent to the column.

17. The non-transitory computer-readable storage medium of claim 16, wherein the second content comprises a second context element that is associated with a second object, wherein the second object is displayed within the display area adjacently to the second context element, wherein automatically reflowing the second content comprises moving the second context element within the second column, and wherein the instructions, upon execution by the processor, further cause the system to:

automatically move the second object based on a movement of the second context element such that the second object and the second context element remain adjacent to each other within the display area.

18. The non-transitory computer-readable storage medium of claim 17, wherein automatically reflowing the content comprises moving the portion of the text from the column to the second column, and wherein the second context element is moved within the second column based on the portion of the text being moved to the second column.

* * * * *